United States Patent
Tessier et al.

(10) Patent No.: US 11,311,958 B1
(45) Date of Patent: Apr. 26, 2022

(54) DIGITAL WELDING AND CUTTING EFFICIENCY ANALYSIS, PROCESS EVALUATION AND RESPONSE FEEDBACK SYSTEM FOR PROCESS OPTIMIZATION

(71) Applicant: Airgas, Inc., Radnor, PA (US)

(72) Inventors: Robert Tessier, Radnor, PA (US); Eric Klein, Houston, TX (US)

(73) Assignee: Airgas, Inc., Radnor, PA (US)

( * ) Notice: Subject to any disclaimer, the term of this patent is extended or adjusted under 35 U.S.C. 154(b) by 256 days.

(21) Appl. No.: 16/410,331

(22) Filed: May 13, 2019

(51) Int. Cl.
*B23K 9/10* (2006.01)
*B23K 9/095* (2006.01)

(52) U.S. Cl.
CPC ................... *B23K 9/0953* (2013.01)

(58) Field of Classification Search
CPC .................................................. B23K 9/0953
USPC ....................................................... 219/130.1
See application file for complete search history.

(56) References Cited

U.S. PATENT DOCUMENTS

| | | | | |
|---|---|---|---|---|
| 2,027,224 A * | 1/1936 | David | ...................... | B23K 9/10 219/130.01 |
| 2,340,114 A * | 1/1944 | Duis | ........................ | G07C 1/08 377/16 |
| 2,366,548 A * | 1/1945 | Oestreicher | .............. | B23K 9/10 368/9 |
| 3,359,561 A * | 12/1967 | Shostek | ................... | B23K 9/10 346/17 |
| 3,532,853 A * | 10/1970 | Herring, Jr. | ............ | B23K 9/095 219/130.01 |
| 3,535,491 A * | 10/1970 | Krolski | ...................... | G04F 8/08 219/130.01 |
| 3,673,377 A * | 6/1972 | Erdmann-Jesnitzer | ...................... | B23K 9/10 219/130.31 |
| 3,725,637 A * | 4/1973 | Wenrich | ................. | G01R 15/00 219/136 |
| 3,950,759 A * | 4/1976 | Ziegenfuss | ............ | B23K 9/095 346/33 R |
| 4,000,374 A * | 12/1976 | De Keyser | ........... | B23K 9/0734 219/130.33 |
| 4,020,320 A * | 4/1977 | Pijls | ...................... | B23K 9/091 219/137 PS |
| 4,061,264 A * | 12/1977 | Bartels | ................. | B23K 9/0325 228/145 |
| 4,071,732 A * | 1/1978 | Tanaka | ................... | B23K 9/173 219/137 R |
| 4,103,141 A * | 7/1978 | Wristen | ................. | B23K 9/095 219/130.01 |
| 4,136,273 A * | 1/1979 | Eujita | .................. | B23K 9/1675 219/121.36 |
| 4,300,035 A * | 11/1981 | Johansson | .............. | B23K 9/091 219/130.21 |
| 4,300,036 A * | 11/1981 | Johansson | .............. | B23K 9/091 219/130.33 |
| 4,375,026 A * | 2/1983 | Kearney | .................. | B23K 9/10 219/130.01 |

(Continued)

*Primary Examiner* — Eric S Stapleton
(74) *Attorney, Agent, or Firm* — Allen E. White

(57) ABSTRACT

The present invention combines automatic process control feedback or process improvement recommendations based on capturing consumable data, running the consumable data through a data analytics processing system and establishing logical process improvement recommendations and actions based on consumable consumption ratios and process inefficiency correlations.

17 Claims, 3 Drawing Sheets

(56) References Cited

U.S. PATENT DOCUMENTS

| | | | | |
|---|---|---|---|---|
| 4,389,561 A * | 6/1983 | Weman | B23Q 15/22 219/124.34 |
| 4,419,560 A * | 12/1983 | Zurek | B23K 11/252 219/110 |
| 4,492,847 A * | 1/1985 | Masaki | B23K 9/1274 219/124.34 |
| 4,518,844 A * | 5/1985 | Needham | B23K 9/125 219/130.01 |
| 4,527,045 A * | 7/1985 | Nakajima | B23K 9/1062 219/130.21 |
| 4,547,800 A * | 10/1985 | Masaki | G01B 11/022 348/90 |
| 4,555,614 A * | 11/1985 | Morris | B23K 9/0956 219/130.01 |
| 4,590,577 A * | 5/1986 | Nio | B23K 9/1272 219/124.33 |
| 4,591,689 A * | 5/1986 | Brown | B23Q 35/127 219/124.34 |
| 4,594,497 A * | 6/1986 | Takahashi | B23K 9/127 219/124.34 |
| 4,595,186 A * | 6/1986 | Reed | B23K 37/0461 269/243 |
| 4,605,836 A * | 8/1986 | Retfalvi | B23K 31/125 219/130.01 |
| 4,609,806 A * | 9/1986 | Grabkowski | B23K 9/22 219/109 |
| 4,645,902 A * | 2/1987 | Hayakawa | B23K 9/0953 219/125.11 |
| 4,647,754 A * | 3/1987 | Hirasawa | B23K 9/091 219/130.01 |
| 4,663,270 A * | 5/1987 | Potember | B82Y 10/00 365/106 |
| 4,672,173 A * | 6/1987 | Nomura | B23K 9/038 219/125.1 |
| 4,680,014 A * | 7/1987 | Paton | G09B 19/24 434/234 |
| 4,689,021 A * | 8/1987 | Vasiliev | G09B 19/24 434/234 |
| 4,716,273 A * | 12/1987 | Paton | G09B 19/24 219/130.1 |
| 4,721,947 A * | 1/1988 | Brown | B23K 9/0956 228/103 |
| 4,728,768 A * | 3/1988 | Cueman | B23K 9/22 219/109 |
| 4,877,940 A * | 10/1989 | Bangs | B23Q 35/127 219/124.34 |
| 4,954,690 A * | 9/1990 | Kensrue | B23K 9/12 219/137.31 |
| 4,975,558 A * | 12/1990 | Lukens | B23K 9/08 219/123 |
| 4,996,409 A * | 2/1991 | Paton | B23K 9/0953 219/130.01 |
| 5,053,976 A * | 10/1991 | Nose | B25J 9/1607 700/251 |
| 5,189,277 A * | 2/1993 | Boisvert | B23K 10/006 219/121.48 |
| 5,221,825 A * | 6/1993 | Siewert | B23K 9/1062 219/130.01 |
| 5,233,158 A * | 8/1993 | Karakama | B23K 9/0956 219/130.33 |
| 5,270,516 A * | 12/1993 | Hamamoto | B23K 9/0956 219/130.21 |
| 5,278,390 A * | 1/1994 | Blankenship | B23K 9/0953 219/130.5 |
| 5,283,418 A * | 2/1994 | Bellows | B23K 31/006 219/130.01 |
| 5,302,799 A * | 4/1994 | Kennedy | B23K 9/127 219/124.34 |
| 5,305,183 A * | 4/1994 | Teynor | B23K 9/1062 211/41.17 |
| 5,357,078 A * | 10/1994 | Smith | B23K 9/091 219/130.51 |
| 5,552,575 A * | 9/1996 | Doumanidis | B23K 9/0953 219/121.14 |
| 5,571,431 A * | 11/1996 | Lantieri | B23K 9/0953 219/130.01 |
| 5,589,692 A * | 12/1996 | Reed | B82Y 10/00 257/23 |
| 5,602,462 A * | 2/1997 | Stich | G05F 1/147 307/64 |
| 5,670,070 A * | 9/1997 | Clark | B23K 9/0953 219/130.33 |
| 5,674,415 A * | 10/1997 | Leong | B23K 26/032 219/121.63 |
| 5,708,253 A * | 1/1998 | Bloch | B23K 9/0953 219/130.01 |
| 5,756,967 A * | 5/1998 | Quinn | B23K 9/09 219/130.01 |
| 5,772,814 A * | 6/1998 | Grewell | B23K 31/125 156/64 |
| 5,805,442 A * | 9/1998 | Crater | G05B 19/4185 700/9 |
| 5,815,400 A * | 9/1998 | Hirai | G05B 19/401 700/173 |
| 5,824,991 A * | 10/1998 | Mita | B23K 9/092 219/130.51 |
| 5,920,856 A * | 7/1999 | Syeda-Mahmood | G06F 16/40 |
| 5,923,555 A * | 7/1999 | Bailey | B23K 9/044 700/114 |
| 5,932,123 A * | 8/1999 | Marhofer | B23K 9/12 219/130.01 |
| 5,955,762 A * | 9/1999 | Hively | H01L 21/563 257/355 |
| 6,024,273 A * | 2/2000 | Ludewig | B23K 9/0956 219/130.01 |
| 6,031,203 A * | 2/2000 | Suzuki | B23K 9/073 219/130.01 |
| 6,040,545 A * | 3/2000 | Taki | B23K 9/0213 219/137 R |
| 6,041,287 A * | 3/2000 | Dister | B60L 3/0023 702/182 |
| 6,051,805 A * | 4/2000 | Vaidya | B23K 9/0953 219/130.01 |
| 6,055,180 A * | 4/2000 | Gudesen | B82Y 10/00 365/105 |
| 6,067,129 A * | 5/2000 | Fergason | A61F 9/067 2/8.8 |
| 6,087,626 A * | 7/2000 | Hutchison | B23K 9/091 219/130.01 |
| 6,096,994 A * | 8/2000 | Handa | B23K 9/1062 219/130.5 |
| 6,111,215 A * | 8/2000 | Lilly | B23K 9/1006 219/130.51 |
| 6,133,543 A * | 10/2000 | Borowy | H05H 1/36 219/121.57 |
| 6,214,423 B1 * | 4/2001 | Lee | B05D 1/62 427/492 |
| 6,214,749 B1 * | 4/2001 | Watanabe | H01L 21/02126 257/E21.247 |
| 6,233,570 B1 * | 5/2001 | Horvitz | G06N 5/00 706/11 |
| 6,236,017 B1 * | 5/2001 | Smartt | B23K 9/093 219/130.01 |
| 6,239,494 B1 * | 5/2001 | Besser | H01L 23/53233 257/700 |
| 6,242,711 B1 * | 6/2001 | Cooper | A61F 9/06 219/130.01 |
| 6,272,038 B1 * | 8/2001 | Clausen | B82Y 10/00 365/151 |
| 6,314,019 B1 * | 11/2001 | Kuekes | B82Y 10/00 365/151 |
| 6,315,186 B1 * | 11/2001 | Friedl | B23K 9/1062 228/102 |
| 6,320,200 B1 * | 11/2001 | Reed | B82Y 10/00 257/40 |
| 6,324,091 B1 * | 11/2001 | Gryko | B82Y 10/00 365/151 |

(56) References Cited

U.S. PATENT DOCUMENTS

| | | | | |
|---|---|---|---|---|
| 6,329,635 B1* | 12/2001 | Leong | B23K 26/032 | 219/121.83 |
| 6,331,694 B1* | 12/2001 | Blankenship | B23K 9/091 | 219/130.1 |
| 6,344,412 B1* | 2/2002 | Ichikawa | H01L 21/76801 | 257/E21.576 |
| 6,348,700 B1* | 2/2002 | Ellenbogen | B82Y 10/00 | 257/14 |
| 6,365,868 B1* | 4/2002 | Borowy | B23K 10/006 | 219/121.54 |
| 6,430,810 B1* | 8/2002 | Bailey | H05K 3/043 | 29/825 |
| 6,441,342 B1* | 8/2002 | Hsu | B23K 9/091 | 219/130.01 |
| 6,479,793 B1* | 11/2002 | Wittmann | B23K 9/0953 | 219/130.5 |
| 6,501,049 B2* | 12/2002 | Stava | B23K 9/09 | 219/130.21 |
| 6,504,131 B1* | 1/2003 | Hayes | B23K 9/0953 | 219/130.01 |
| 6,506,997 B2* | 1/2003 | Matsuyama | B23K 11/252 | 219/109 |
| 6,531,684 B2* | 3/2003 | Rice | B23K 9/073 | 219/130.21 |
| 6,541,816 B2* | 4/2003 | Ramsbey | H01L 27/105 | 257/324 |
| 6,566,636 B1* | 5/2003 | Bentley | G05D 23/26 | 219/663 |
| 6,583,386 B1* | 6/2003 | Ivkovich | B23K 9/0953 | 219/125.1 |
| 6,608,285 B2* | 8/2003 | Lefebvre | B23K 9/025 | 219/137 R |
| 6,614,002 B2* | 9/2003 | Weber | B23K 26/032 | 219/121.78 |
| 6,614,048 B2* | 9/2003 | Leuschner | B82Y 10/00 | 257/40 |
| 6,621,049 B2* | 9/2003 | Suzuki | B23K 9/0953 | 219/130.01 |
| 6,624,457 B2* | 9/2003 | Li | B82Y 10/00 | 257/295 |
| 6,627,850 B1* | 9/2003 | Koga | B23K 9/0956 | 219/137 PS |
| 6,656,763 B1* | 12/2003 | Oglesby | B82Y 10/00 | 438/800 |
| 6,670,574 B1* | 12/2003 | Bates | B23K 26/03 | 219/121.63 |
| 6,703,585 B2* | 3/2004 | Suzuki | B23K 9/0953 | 219/130.01 |
| 6,708,877 B2* | 3/2004 | Blankenship | B23K 9/1062 | 235/375 |
| 6,710,298 B2* | 3/2004 | Eriksson | A61F 9/06 | 219/130.01 |
| 6,744,011 B1* | 6/2004 | Hu | B23K 9/0953 | 219/130.01 |
| 6,747,246 B2* | 6/2004 | Crandell, III | B23K 9/1006 | 219/130.1 |
| 6,758,423 B1* | 7/2004 | Perkins | B05B 5/00 | 239/67 |
| 6,791,062 B1* | 9/2004 | Brunner | B23K 9/1276 | 219/124.34 |
| 6,795,778 B2* | 9/2004 | Dodge | B23K 9/0953 | 702/34 |
| 6,797,921 B1* | 9/2004 | Niedereder | B23K 9/1062 | 219/130.5 |
| 6,912,447 B2* | 6/2005 | Klimko | B23K 31/02 | 219/85.1 |
| 6,927,360 B2* | 8/2005 | Artelsmair | B23K 9/126 | 219/124.22 |
| 6,947,801 B2* | 9/2005 | Lin | G05B 19/41865 | 700/108 |
| 6,977,357 B2* | 12/2005 | Hsu | B23K 9/0953 | 219/130.01 |
| 7,015,419 B2* | 3/2006 | Hackl | B23K 9/1087 | 219/130.21 |
| 7,032,814 B2* | 4/2006 | Blankenship | B23K 9/1062 | 235/375 |
| 7,050,937 B2* | 5/2006 | Lee | B25J 9/1674 | 700/108 |
| 7,159,753 B2* | 1/2007 | Subrahmanyam | B23K 9/095 | 228/102 |
| 7,162,534 B2* | 1/2007 | Schleiss | G05B 19/4185 | 709/232 |
| 7,173,215 B1* | 2/2007 | Kapoor | B23K 31/02 | 219/130.01 |
| 7,183,517 B2* | 2/2007 | Albrecht | B23K 9/1056 | 219/130.4 |
| 7,186,949 B2* | 3/2007 | Nishikawa | B23K 9/0956 | 219/130.01 |
| 7,194,447 B2* | 3/2007 | Harvey | B23K 9/0953 | 700/49 |
| 7,206,661 B2* | 4/2007 | Subrahmanyam | B23K 31/02 | 345/420 |
| 7,227,099 B2* | 6/2007 | Blot | B23K 9/10 | 219/130.01 |
| 7,268,318 B2* | 9/2007 | Ikeda | B23K 9/0953 | 219/130.1 |
| 7,282,667 B2* | 10/2007 | Hsu | B23K 9/0953 | 219/130.01 |
| 7,318,011 B2* | 1/2008 | Subrahmanyam | G06T 17/10 | 228/102 |
| 7,564,005 B2* | 7/2009 | Cabanaw | B23K 11/253 | 219/109 |
| 7,643,890 B1* | 1/2010 | Hillen | B23K 9/0953 | 340/3.1 |
| 7,766,213 B2* | 8/2010 | Henrikson | B23K 9/0956 | 228/103 |
| 7,767,933 B2* | 8/2010 | Matus | B23K 9/1006 | 219/130.1 |
| 7,853,435 B2* | 12/2010 | Dodge | B23K 9/0953 | 702/183 |
| 7,962,967 B2* | 6/2011 | Becker | A61F 9/06 | 2/8.1 |
| 8,121,729 B2* | 2/2012 | Blanc | B25J 9/1674 | 380/277 |
| 8,224,881 B1* | 7/2012 | Spear | B23K 9/0953 | 707/899 |
| 8,239,094 B2* | 8/2012 | Underdal | G06Q 10/0631 | 701/29.4 |
| 8,269,141 B2* | 9/2012 | Daniel | B23K 9/09 | 219/130.1 |
| 8,364,800 B2* | 1/2013 | Bice | H04L 29/06 | 709/223 |
| 8,412,402 B2* | 4/2013 | Underdal | G06N 5/022 | 701/29.1 |
| 8,423,226 B2* | 4/2013 | Underdal | G06N 7/005 | 701/31.4 |
| 8,428,813 B2* | 4/2013 | Gilbert | G06N 5/04 | 701/31.4 |
| 8,513,568 B2* | 8/2013 | Kawamoto | B23K 9/0731 | 219/125.1 |
| 8,569,646 B2* | 10/2013 | Daniel | B23K 9/0953 | 219/110 |
| 8,575,516 B2* | 11/2013 | Nishisaka | B23K 9/0956 | 219/130.1 |
| 8,581,147 B2* | 11/2013 | Kooken | B23K 9/095 | 219/137.7 |
| 8,598,491 B2* | 12/2013 | Peters | B23K 9/1062 | 219/130.1 |
| 8,648,700 B2* | 2/2014 | Gilbert | B60R 16/0234 | 340/425.5 |
| 8,680,434 B2* | 3/2014 | Stoger | B23K 9/1276 | 219/136 |
| 8,686,318 B2* | 4/2014 | Albrecht | B23K 9/10 | 219/137.71 |
| 8,688,815 B2* | 4/2014 | Chantry | B23K 9/1006 | 219/136 |
| 8,689,241 B2* | 4/2014 | Naik | G06F 11/0781 | 719/318 |

(56) References Cited

U.S. PATENT DOCUMENTS

| | | | | |
|---|---|---|---|---|
| 8,700,781 B2* | 4/2014 | Sawyer | H04L 51/14 | 709/227 |
| 8,704,135 B2* | 4/2014 | Narayanan | B23K 9/093 | 219/130.1 |
| 8,747,116 B2* | 6/2014 | Zboray | G09B 19/24 | 219/130.21 |
| 8,762,165 B2* | 6/2014 | Gilbert | G06N 5/003 | 705/2 |
| 8,785,816 B2* | 7/2014 | Kooken | B23K 9/095 | 219/130.1 |
| 8,834,168 B2* | 9/2014 | Peters | G09B 5/02 | 434/219 |
| 8,847,115 B2* | 9/2014 | Casner | B23K 9/0953 | 219/130.5 |
| 8,851,896 B2* | 10/2014 | Wallace | G09B 5/00 | 434/234 |
| 8,884,177 B2* | 11/2014 | Daniel | B23K 31/12 | 219/110 |
| 8,911,237 B2* | 12/2014 | Postlethwaite | G09B 19/24 | 434/219 |
| 8,992,226 B1* | 3/2015 | Leach | G09B 19/24 | 434/234 |
| 9,011,154 B2* | 4/2015 | Kindig | G09B 19/24 | 434/234 |
| 9,018,563 B2* | 4/2015 | Yamazaki | B23K 9/092 | 219/130.01 |
| 9,081,883 B2* | 7/2015 | Wittliff, III | G16H 50/20 | |
| 9,101,994 B2* | 8/2015 | Albrecht | B23K 9/00 | |
| 9,129,330 B2* | 9/2015 | Albrecht | G06Q 30/0633 | |
| 9,144,860 B2* | 9/2015 | Garza | B23K 11/115 | |
| 9,174,294 B2* | 11/2015 | Hutchison | B23K 9/0953 | |
| 9,196,169 B2* | 11/2015 | Wallace | G09B 5/02 | |
| 9,210,285 B2* | 12/2015 | Okayama | H04N 1/00204 | |
| 9,221,117 B2* | 12/2015 | Conrardy | B23K 37/04 | |
| 9,230,449 B2* | 1/2016 | Conrardy | B23K 9/0956 | |
| 9,269,279 B2* | 2/2016 | Penrod | B23K 9/0956 | |
| 9,280,913 B2* | 3/2016 | Peters | G09B 5/00 | |
| 9,314,878 B2* | 4/2016 | Abou-Nasr | B23K 31/125 | |
| 9,318,026 B2* | 4/2016 | Peters | G09B 19/24 | |
| 9,330,575 B2* | 5/2016 | Peters | G09B 5/00 | |
| 9,352,411 B2* | 5/2016 | Batzler | B23K 9/32 | |
| 9,368,045 B2* | 6/2016 | Becker | G09B 9/00 | |
| 9,415,514 B2* | 8/2016 | Geheb | G05B 19/409 | |
| 9,442,481 B2* | 9/2016 | Davidson | B23K 9/0956 | |
| 9,443,710 B2* | 9/2016 | Platt | H01J 49/26 | |
| 9,468,988 B2* | 10/2016 | Daniel | B23K 31/12 | |
| 9,483,959 B2* | 11/2016 | Wallace | G09B 19/24 | |
| 9,492,879 B2* | 11/2016 | Kazmaier | B23K 9/0953 | |
| 9,511,443 B2* | 12/2016 | Pfeifer | B23K 9/095 | |
| 9,555,495 B2* | 1/2017 | Meckler | B23K 9/124 | |
| 9,582,153 B1* | 2/2017 | Childress | G06F 3/0482 | |
| 9,583,014 B2* | 2/2017 | Becker | G09B 5/00 | |
| 9,583,023 B2* | 2/2017 | Becker | G09B 19/24 | |
| 9,589,481 B2* | 3/2017 | Becker | G09B 19/24 | |
| 9,639,082 B2* | 5/2017 | D'Angelo | G05B 19/41875 | |
| 9,647,555 B2* | 5/2017 | Kooken | B23K 9/1056 | |
| 9,666,100 B2* | 5/2017 | Becker | G09B 19/24 | |
| 9,666,160 B2* | 5/2017 | Patel | G09G 5/006 | |
| 9,672,757 B2* | 6/2017 | Becker | G09B 19/24 | |
| 9,685,099 B2* | 6/2017 | Boulware | G09B 19/24 | |
| 9,700,953 B2* | 7/2017 | Flewelling | B23K 9/0956 | |
| 9,713,852 B2* | 7/2017 | Becker | B23K 9/0956 | |
| 9,724,787 B2* | 8/2017 | Becker | G09B 19/24 | |
| 9,724,788 B2* | 8/2017 | Becker | B23K 37/006 | |
| 9,728,103 B2* | 8/2017 | Becker | G09B 19/24 | |
| 9,751,149 B2* | 9/2017 | Becker | B23K 9/0956 | |
| 9,754,509 B2* | 9/2017 | Zboray | G09B 5/02 | |
| 9,757,819 B2* | 9/2017 | Becker | B23K 37/00 | |
| 9,764,406 B2* | 9/2017 | Lambert | B23K 9/0953 | |
| 9,767,712 B2* | 9/2017 | Postlethwaite | G09B 19/24 | |
| 9,773,429 B2* | 9/2017 | Boulware | B23K 9/173 | |
| 9,836,987 B2* | 12/2017 | Postlethwaite | G09B 5/06 | |
| 9,839,967 B2* | 12/2017 | Kooken | B23K 9/1043 | |
| 9,855,620 B2* | 1/2018 | Kooken | B23K 9/1075 | |
| 9,862,049 B2* | 1/2018 | Becker | B23K 9/0953 | |
| 9,868,171 B2* | 1/2018 | Lambert | B23K 9/0673 | |
| 9,875,665 B2* | 1/2018 | Beeson | B23K 9/0956 | |
| 9,895,267 B2* | 2/2018 | Cole | A61F 9/06 | |
| 9,911,359 B2* | 3/2018 | Wallace | G09B 5/00 | |
| 9,937,577 B2* | 4/2018 | Daniel | B23K 9/0956 | |
| 9,937,578 B2* | 4/2018 | Becker | B23K 9/0956 | |
| 9,956,639 B2* | 5/2018 | Kooken | B23K 9/09 | |
| 9,975,196 B2* | 5/2018 | Zhang | G01C 21/16 | |
| 9,975,728 B2* | 5/2018 | Gelmetti | B65D 43/02 | |
| 9,977,242 B2* | 5/2018 | Patel | G02B 27/017 | |
| 9,993,891 B2* | 6/2018 | Wiryadinata | B23K 9/0956 | |
| 10,010,959 B2* | 7/2018 | Daniel | B23K 9/095 | |
| 10,010,962 B1* | 7/2018 | Gelmetti | B23K 9/095 | |
| 10,035,209 B2* | 7/2018 | Daniel | B23K 9/0731 | |
| 10,056,010 B2* | 8/2018 | Salsich | G09B 19/24 | |
| 10,083,627 B2* | 9/2018 | Daniel | G09B 19/24 | |
| 10,105,782 B2* | 10/2018 | Becker | B23K 9/10 | |
| 10,170,019 B2* | 1/2019 | Becker | G09B 19/24 | |
| 10,195,681 B2* | 2/2019 | Mnich | B23K 9/073 | |
| 10,198,962 B2* | 2/2019 | Postlethwaite | G09B 5/00 | |
| 10,201,868 B2* | 2/2019 | Dunahoo | B23K 9/0953 | |
| 10,204,406 B2* | 2/2019 | Becker | B23K 9/0953 | |
| 10,210,773 B2* | 2/2019 | Becker | G09B 19/24 | |
| 10,213,861 B2* | 2/2019 | Stoner | B23K 9/09 | |
| 10,239,147 B2* | 3/2019 | Denis | B23K 9/0956 | |
| 10,307,853 B2* | 6/2019 | Becker | B23K 9/0953 | |
| 10,335,883 B2* | 7/2019 | Albrecht | B23K 9/0026 | |
| 10,343,231 B2* | 7/2019 | Gelmetti | B23K 9/124 | |
| 10,350,696 B2* | 7/2019 | Gelmetti | B23K 9/124 | |
| 10,363,626 B2* | 7/2019 | Åberg | B23K 9/091 | |
| 10,363,632 B2* | 7/2019 | Hsu | B23K 31/02 | |
| 2002/0008095 A1* | 1/2002 | Norrish | B23K 9/092 | 219/137 PS |
| 2002/0088786 A1* | 7/2002 | Rouault | B23K 31/00 | 219/130.01 |
| 2002/0134762 A1* | 9/2002 | Okanda | B23K 11/255 | 219/86.51 |
| 2002/0162489 A1* | 11/2002 | Ryaboy | G01M 11/04 | 108/136 |
| 2002/0168937 A1* | 11/2002 | Clark | B23K 9/1062 | 455/41.1 |
| 2002/0170899 A1* | 11/2002 | Suzuki | B23K 9/0953 | 219/130.01 |
| 2002/0198667 A1* | 12/2002 | Dodge | B23K 9/0953 | 702/34 |
| 2003/0052107 A1* | 3/2003 | Suzuki | B23K 9/0953 | 219/130.01 |
| 2003/0071025 A1* | 4/2003 | Hsu | B23K 9/09 | 219/130.5 |
| 2003/0094487 A1* | 5/2003 | Blankenship | B23K 9/1062 | 235/375 |
| 2004/0004113 A1* | 1/2004 | Blankenship | B23K 9/1062 | 235/375 |
| 2004/0020907 A1* | 2/2004 | Zauner | B23K 9/0953 | 219/130.21 |
| 2004/0045945 A1* | 3/2004 | Shimogama | B23K 9/0953 | 219/130.5 |
| 2004/0129759 A1* | 7/2004 | Rouault | B23K 31/00 | 228/102 |
| 2004/0215422 A1* | 10/2004 | Dodge | B23K 9/0953 | 702/183 |
| 2005/0003925 A1* | 1/2005 | Wakashiro | B60K 6/485 | 477/2 |
| 2005/0006363 A1* | 1/2005 | Hsu | B23K 9/0953 | 219/130.01 |
| 2005/0055127 A1* | 3/2005 | Swain | B23Q 9/00 | 700/186 |
| 2005/0072769 A1* | 4/2005 | Blot | B23K 9/10 | 219/130.5 |
| 2005/0103767 A1* | 5/2005 | Kainec | B23K 9/10 | 219/130.5 |
| 2005/0133488 A1* | 6/2005 | Blankenship | B23K 9/02 | 219/130.01 |
| 2005/0173419 A1* | 8/2005 | Miller | B23K 9/0213 | 219/656 |

(56) References Cited

U.S. PATENT DOCUMENTS

| | | | |
|---|---|---|---|
| 2005/0178699 A1* | 8/2005 | Lopez | B07C 1/00 209/584 |
| 2005/0252897 A1* | 11/2005 | Hsu | B23K 9/0953 219/130.01 |
| 2005/0252898 A1* | 11/2005 | Blechinger | B23K 9/1062 219/130.5 |
| 2006/0011595 A1* | 1/2006 | Daniel | B23K 9/09 219/130.1 |
| 2006/0043081 A1* | 3/2006 | Martin | B23K 9/1006 219/130.1 |
| 2006/0175313 A1* | 8/2006 | Kooken | B23K 9/09 219/130.1 |
| 2006/0213892 A1* | 9/2006 | Ott | B23K 9/0953 219/132 |
| 2006/0226130 A1* | 10/2006 | Kooken | B23K 9/1056 219/130.1 |
| 2007/0051712 A1* | 3/2007 | Kooken | B23K 9/095 219/130.1 |
| 2007/0080153 A1* | 4/2007 | Albrecht | B23K 9/10 219/130.01 |
| 2007/0164007 A1* | 7/2007 | Peters | B23K 9/091 219/130.51 |
| 2007/0181548 A1* | 8/2007 | Kaddani | B23K 9/1062 219/130.21 |
| 2007/0187378 A1* | 8/2007 | Karakas | B23K 9/1087 219/130.21 |
| 2007/0278196 A1* | 12/2007 | James | B23K 31/12 219/130.01 |
| 2008/0061113 A9* | 3/2008 | Seki | B23K 9/0953 228/103 |
| 2008/0078811 A1* | 4/2008 | Hillen | B23K 9/095 228/101 |
| 2008/0083705 A1* | 4/2008 | Peters | B23K 9/1068 219/61 |
| 2008/0149608 A1* | 6/2008 | Albrecht | B23K 9/0956 219/130.1 |
| 2008/0156781 A1* | 7/2008 | Artelsmair | B23K 9/091 219/130.5 |
| 2008/0234960 A1* | 9/2008 | Byington | G01B 11/25 702/81 |
| 2008/0296276 A1* | 12/2008 | Schartner | B23K 9/1031 219/130.31 |
| 2008/0314887 A1* | 12/2008 | Stoger | B23K 9/0956 219/137 R |
| 2009/0008368 A1* | 1/2009 | Beeson | B23K 9/1006 219/121.39 |
| 2009/0032513 A1* | 2/2009 | Nishisaka | B23K 9/0956 219/130.1 |
| 2009/0173726 A1* | 7/2009 | Davidson | B23K 9/0956 219/130.01 |
| 2009/0184098 A1* | 7/2009 | Daniel | B23K 9/0953 219/130.1 |
| 2009/0188903 A1* | 7/2009 | Hu | B23K 9/0953 219/137 R |
| 2009/0200281 A1* | 8/2009 | Hampton | B23K 9/0953 219/130.33 |
| 2009/0200282 A1* | 8/2009 | Hampton | B23K 9/0953 219/130.33 |
| 2009/0222804 A1* | 9/2009 | Kaufman | B23K 9/0953 717/168 |
| 2009/0234483 A1* | 9/2009 | Leko | B23K 9/0953 700/110 |
| 2009/0313549 A1* | 12/2009 | Casner | B23K 9/0953 715/740 |
| 2010/0012635 A1* | 1/2010 | Wierschke | B23K 9/1056 219/130.1 |
| 2010/0048273 A1* | 2/2010 | Wallace | G09B 19/24 463/7 |
| 2010/0062405 A1* | 3/2010 | Zboray | G09B 19/24 434/234 |
| 2010/0062406 A1* | 3/2010 | Zboray | G09B 19/003 434/234 |
| 2010/0133247 A1* | 6/2010 | Mazumder | B23K 9/02 219/121.83 |
| 2010/0288735 A1* | 11/2010 | Schmitt | B23K 9/0953 219/99 |
| 2010/0301018 A1* | 12/2010 | Holt | B23K 9/095 219/74 |
| 2010/0301030 A1* | 12/2010 | Zhang | B23K 9/0953 219/130.1 |
| 2010/0314362 A1* | 12/2010 | Albrecht | B23K 9/0953 219/121.63 |
| 2010/0314370 A1* | 12/2010 | Granato, Jr. | B23K 9/173 219/130.1 |
| 2011/0000892 A1* | 1/2011 | Mueller | B23K 11/063 219/81 |
| 2011/0006047 A1* | 1/2011 | Penrod | B23K 9/0956 219/137 R |
| 2011/0017718 A1* | 1/2011 | Kazmaier | B23K 9/0953 219/137 PS |
| 2011/0114615 A1* | 5/2011 | Daniel | B23K 9/0953 219/137 R |
| 2011/0117527 A1* | 5/2011 | Conrardy | B23K 9/0956 434/234 |
| 2011/0163072 A1* | 7/2011 | Vogel | B23K 9/0953 219/74 |
| 2011/0183304 A1* | 7/2011 | Wallace | G09B 19/24 434/234 |
| 2011/0220619 A1* | 9/2011 | Mehn | B23K 9/0953 219/108 |
| 2011/0220628 A1* | 9/2011 | Mehn | B23K 9/124 219/130.1 |
| 2011/0240605 A1* | 10/2011 | Takayama | B23K 11/115 219/86.1 |
| 2011/0290765 A1* | 12/2011 | Albrecht | B23K 9/00 219/78.01 |
| 2011/0290771 A1* | 12/2011 | Fukunaga | B23K 9/1735 219/130.1 |
| 2011/0301733 A1* | 12/2011 | Yoshima | B23K 9/0216 700/96 |
| 2011/0316516 A1* | 12/2011 | Schiefermuller | A61F 9/06 323/318 |
| 2012/0037600 A1* | 2/2012 | Katoh | B23K 9/00 219/59.1 |
| 2012/0048838 A1* | 3/2012 | Ishida | B23K 26/032 219/121.83 |
| 2012/0085741 A1* | 4/2012 | Holverson | B23K 9/0953 219/136 |
| 2012/0095941 A1* | 4/2012 | Dolson | B23K 9/0953 705/400 |
| 2012/0111837 A1* | 5/2012 | Al-Mostaneer | B23K 9/0284 219/73 |
| 2012/0152920 A1* | 6/2012 | Enyedy | B23K 9/095 219/130.1 |
| 2012/0189993 A1* | 7/2012 | Kindig | G09B 19/24 434/234 |
| 2012/0205359 A1* | 8/2012 | Daniel | B23K 9/0953 219/130.01 |
| 2012/0298640 A1* | 11/2012 | Conrardy | B23K 37/04 219/130.01 |
| 2012/0298644 A1* | 11/2012 | Lambert | B23K 9/0953 219/130.31 |
| 2013/0116849 A1* | 5/2013 | Kooken | B23K 9/1043 700/297 |
| 2013/0119037 A1* | 5/2013 | Daniel | B23K 9/095 219/130.21 |
| 2013/0153557 A1* | 6/2013 | Pagano | B23K 9/0216 219/130.51 |
| 2013/0182070 A1* | 7/2013 | Peters | G09B 5/02 348/43 |
| 2013/0189657 A1* | 7/2013 | Wallace | G09B 5/00 434/234 |
| 2013/0189658 A1* | 7/2013 | Peters | G09B 5/00 434/234 |
| 2013/0208569 A1* | 8/2013 | Pfeifer | B23K 9/095 367/129 |
| 2013/0209976 A1* | 8/2013 | Postlethwaite | G09B 19/003 434/234 |

(56) References Cited

U.S. PATENT DOCUMENTS

| | | | | |
|---|---|---|---|---|
| 2013/0256287 A1* | 10/2013 | Cole | B23K 9/0216 | 219/122 |
| 2013/0256289 A1* | 10/2013 | Knoener | G01R 31/02 | 219/130.21 |
| 2013/0264319 A1* | 10/2013 | Temby | B23K 9/095 | 219/130.1 |
| 2013/0264323 A1* | 10/2013 | Daniel | B23K 9/093 | 219/137 PS |
| 2013/0291271 A1* | 11/2013 | Becker | G06F 3/005 | 2/8.2 |
| 2013/0327746 A1* | 12/2013 | Hemmert | B23K 9/125 | 219/124.1 |
| 2014/0001166 A1* | 1/2014 | Peters | B23K 9/0216 | 219/130.1 |
| 2014/0008342 A1* | 1/2014 | Peters | B23K 9/092 | 219/130.21 |
| 2014/0017642 A1* | 1/2014 | Postlethwaite | G09B 19/24 | 434/234 |
| 2014/0042135 A1* | 2/2014 | Daniel | B23K 9/10 | 219/130.5 |
| 2014/0042136 A1* | 2/2014 | Daniel | B23K 9/0953 | 219/130.5 |
| 2014/0042137 A1* | 2/2014 | Daniel | B23K 9/0953 | 219/130.5 |
| 2014/0131320 A1* | 5/2014 | Hearn | B23K 9/092 | 219/74 |
| 2014/0134579 A1* | 5/2014 | Becker | G09B 5/00 | 434/234 |
| 2014/0134580 A1* | 5/2014 | Becker | G09B 9/00 | 434/234 |
| 2014/0175072 A1* | 6/2014 | Hutchison | B23K 9/1093 | 219/130.1 |
| 2014/0238965 A1* | 8/2014 | Spisic | B23K 9/1006 | 219/132 |
| 2014/0263224 A1* | 9/2014 | Becker | B23K 9/956 | 219/124.5 |
| 2014/0263225 A1* | 9/2014 | Daniel | B23K 9/0953 | 219/125.1 |
| 2014/0263226 A1* | 9/2014 | Daniel | B23K 9/0953 | 219/125.1 |
| 2014/0263227 A1* | 9/2014 | Daniel | B23K 9/0956 | 219/130.01 |
| 2014/0266576 A1* | 9/2014 | Hillen | G07C 9/00111 | 340/5.2 |
| 2014/0272835 A1* | 9/2014 | Becker | G09B 19/24 | 434/234 |
| 2014/0272836 A1* | 9/2014 | Becker | G09B 19/24 | 434/234 |
| 2014/0272837 A1* | 9/2014 | Becker | G09B 19/24 | 434/234 |
| 2014/0272838 A1* | 9/2014 | Becker | G09B 19/24 | 434/234 |
| 2014/0346158 A1* | 11/2014 | Matthews | B23K 9/0953 | 219/130.01 |
| 2014/0374396 A1* | 12/2014 | Luo | B23K 9/0953 | 219/130.01 |
| 2015/0014290 A1* | 1/2015 | Kooken | B23K 9/1075 | 219/130.1 |
| 2015/0021305 A1* | 1/2015 | Rozmarynowski | B23K 9/1043 | 219/130.1 |
| 2015/0021306 A1* | 1/2015 | Rozmarynowski | B23K 9/1043 | 219/130.1 |
| 2015/0028009 A1* | 1/2015 | Ide | B23K 9/0953 | 219/130.32 |
| 2015/0034618 A1* | 2/2015 | Langeder | B23K 9/16 | 219/130.21 |
| 2015/0056584 A1* | 2/2015 | Boulware | B23K 9/173 | 434/234 |
| 2015/0060424 A1* | 3/2015 | Daniel | B23K 9/0953 | 219/130.01 |
| 2015/0068660 A1* | 3/2015 | Wang | B29C 65/08 | 156/64 |
| 2015/0069029 A1* | 3/2015 | Daniel | B23K 9/0953 | 219/125.1 |
| 2015/0072323 A1* | 3/2015 | Postlethwaite | G09B 5/00 | 434/234 |
| 2015/0108096 A1* | 4/2015 | Daniel | B23K 9/044 | 219/76.12 |
| 2015/0114941 A1* | 4/2015 | Denis | B23K 9/1087 | 219/132 |
| 2015/0125836 A1* | 5/2015 | Daniel | G09B 19/24 | 434/234 |
| 2015/0136746 A1* | 5/2015 | Rappl | B23K 9/0953 | 219/130.21 |
| 2015/0154884 A1* | 6/2015 | Salsich | G09B 19/24 | 434/234 |
| 2015/0170539 A1* | 6/2015 | Chica Barrera | G09B 9/00 | 434/234 |
| 2015/0190875 A1* | 7/2015 | Becker | B23K 9/10 | 700/160 |
| 2015/0190876 A1* | 7/2015 | Becker | B23K 9/0956 | 219/124.34 |
| 2015/0190887 A1* | 7/2015 | Becker | B23K 37/00 | 228/103 |
| 2015/0190888 A1* | 7/2015 | Becker | B23K 37/006 | 434/234 |
| 2015/0194072 A1* | 7/2015 | Becker | G09B 19/24 | 434/234 |
| 2015/0194073 A1* | 7/2015 | Becker | G09B 19/24 | 434/234 |
| 2015/0235565 A1* | 8/2015 | Postlethwaite | G09B 9/00 | 434/234 |
| 2015/0248845 A1* | 9/2015 | Postlethwaite | G09B 19/24 | 434/234 |
| 2015/0298349 A1* | 10/2015 | Uoe | B28B 11/006 | 156/73.1 |
| 2015/0375323 A1* | 12/2015 | Becker | B23K 9/0953 | 700/160 |
| 2015/0375324 A1* | 12/2015 | Becker | B23K 9/0953 | 700/212 |
| 2015/0379894 A1* | 12/2015 | Becker | G09B 9/00 | 219/124.1 |
| 2016/0039034 A1* | 2/2016 | Becker | A61F 9/06 | 219/137 R |
| 2016/0039053 A1* | 2/2016 | Becker | G09B 19/24 | 228/102 |
| 2016/0049085 A1* | 2/2016 | Beeson | B23K 9/0956 | 434/234 |
| 2016/0074970 A1* | 3/2016 | Zhai | B23K 31/12 | 73/620 |
| 2016/0077519 A1* | 3/2016 | Punzenberger | G05B 19/41875 | 702/81 |
| 2016/0093233 A1* | 3/2016 | Boulware | B23K 9/0026 | 219/136 |
| 2016/0109349 A1* | 4/2016 | Volckens | G01N 1/2202 | 356/318 |
| 2016/0125593 A1* | 5/2016 | Becker | G06T 7/73 | |
| 2016/0125594 A1* | 5/2016 | Becker | B23K 9/0953 | 348/90 |
| 2016/0125763 A1* | 5/2016 | Becker | B23K 9/126 | 434/234 |
| 2016/0125764 A1* | 5/2016 | Becker | G09B 19/24 | 434/234 |
| 2016/0129515 A1* | 5/2016 | Phillip | B23K 10/00 | 219/121.44 |
| 2016/0163221 A1* | 6/2016 | Sommers | A61F 9/06 | 434/234 |
| 2016/0175962 A1* | 6/2016 | Denis | B23K 9/095 | 219/130.1 |
| 2016/0175963 A1* | 6/2016 | Denis | B23K 9/0953 | 219/130.32 |
| 2016/0175967 A1* | 6/2016 | Denis | B23K 9/095 | 219/130.1 |
| 2016/0175969 A1* | 6/2016 | Denis | B23K 9/0953 | 219/130.21 |
| 2016/0175970 A1* | 6/2016 | Denis | B23K 9/1062 | 219/130.1 |

(56) References Cited

U.S. PATENT DOCUMENTS

| | | | |
|---|---|---|---|
| 2016/0175971 A1* | 6/2016 | Denis | H04B 3/54 219/137 R |
| 2016/0175976 A1* | 6/2016 | Denis | B23K 9/10 219/130.1 |
| 2016/0203735 A1* | 7/2016 | Boulware | G09B 19/24 434/234 |
| 2016/0214198 A1* | 7/2016 | Hsu | B23K 9/0956 |
| 2016/0260261 A1* | 9/2016 | Hsu | G06T 1/20 |
| 2016/0288236 A1* | 10/2016 | Becker | B23K 9/0953 |
| 2016/0303679 A1* | 10/2016 | Ide | B23K 9/073 |
| 2016/0346860 A1* | 12/2016 | Flint | B23K 9/095 |
| 2016/0346861 A1* | 12/2016 | Davidson | B23K 9/0956 |
| 2017/0001254 A1* | 1/2017 | Ide | B23K 9/09 |
| 2017/0036288 A1* | 2/2017 | Albrecht | B23K 9/0953 |
| 2017/0046974 A1* | 2/2017 | Becker | G09B 19/24 |
| 2017/0046976 A1* | 2/2017 | Becker | G09B 19/003 |
| 2017/0046977 A1* | 2/2017 | Becker | B23K 9/0953 |
| 2017/0053557 A1* | 2/2017 | Daniel | G09B 19/24 |
| 2017/0072496 A1* | 3/2017 | Falde | B23K 9/0953 |
| 2017/0072497 A1* | 3/2017 | Ivkovich | B23K 9/0953 |
| 2017/0182605 A1* | 6/2017 | Rajagopalan | B23K 37/003 |
| 2017/0252847 A1* | 9/2017 | Daniel | B23K 9/0956 |
| 2017/0274467 A1* | 9/2017 | Rajagopalan | B23K 9/1087 |
| 2017/0323584 A1* | 11/2017 | Daniel | G09B 19/003 |
| 2017/0326671 A1* | 11/2017 | Chiari | B23K 9/0008 |
| 2017/0330157 A1* | 11/2017 | Lamers | B23K 9/0953 |
| 2018/0029154 A1* | 2/2018 | Rajagopalan | B23K 9/0282 |
| 2018/0029155 A1* | 2/2018 | Garza | B23K 11/115 |
| 2018/0031152 A1* | 2/2018 | Rajagopalan | B23K 37/003 |
| 2018/0050414 A1* | 2/2018 | Hughes | B23K 10/02 |
| 2018/0071850 A1* | 3/2018 | Kooken | B23K 9/1043 |
| 2018/0095640 A1* | 4/2018 | Albright | B23K 9/0953 |
| 2018/0117718 A1* | 5/2018 | Rajagopalan | B23K 37/0531 |
| 2018/0141146 A1* | 5/2018 | Tsuji | B23K 9/0216 |
| 2018/0178308 A1* | 6/2018 | Scotchmer | B23K 9/30 |
| 2018/0354051 A1* | 12/2018 | Uecker | B23K 9/1093 |
| 2019/0030633 A1* | 1/2019 | Zwayer | G01R 31/021 |
| 2019/0039163 A1* | 2/2019 | Kawai | B23K 9/0953 |
| 2019/0047068 A1* | 2/2019 | Magnasco | B23K 9/0956 |
| 2019/0070686 A1* | 3/2019 | Kooken | B23K 9/091 |
| 2019/0084069 A1* | 3/2019 | Daniel | B23K 9/0953 |
| 2019/0126379 A1* | 5/2019 | Kim | B23K 9/0953 |
| 2019/0163172 A1* | 5/2019 | Daniel | B23K 9/126 |
| 2019/0224772 A1* | 7/2019 | Kawai | B23K 9/125 |

* cited by examiner

DIGITAL WELDING AND CUTTING EFFICIENCY ANALYSIS, PROCESS EVALUATION AND RESPONSE FEEDBACK SYSTEM FOR PROCESS OPTIMIZATION

CROSS-REFERENCE TO RELATED APPLICATIONS

None.

STATEMENT REGARDING FEDERALLY SPONSORED RESEARCH OR DEVELOPMENT

None.

Joint Research Agreement

None.

Incorporation-By-Reference of the Material on Compact Disc

None.

Prior Disclosures by the Inventor or a Joint Inventor

None,

BACKGROUND OF THE INVENTION

Welding and cutting process inefficiency drift is a common problem in the industry. While spot checks and corrective actions for improvements in process efficiency yield immediate, localized improvements, invariably the process begins to drift away from ideal conditions again.

There are process analyzers available to measure specific process parameters (i.e. electrical consumption, wire consumption, gas consumption, etc.). An example is U.S. Pat. No. 7,227,099B2, "System and method for improving the productivity of a welding shop", which is incorporated by reference herein. These analyzers typically operate stand alone, the data is not integrated into a comprehensive analytics program, and ultimately does not provide feedback for overall operational process control improvement or specific recommendations that address multiple aspects of the welding or cutting process. As such, slow deviations from ideal process control parameters go unnoticed by process owners over time, resulting in higher costs of inefficiency, productivity and quality.

Operational (macro) level evaluations of welding and fabrication has been performed largely by experienced consultants performing onsite inspections and training. An example of this are the services provided by OMNI-WELD™. While generally beneficial and effective, such operations audits vary in scope, degree of effectiveness, degree of consistency, and cannot be performed continuously or with high frequency.

BRIEF SUMMARY OF THE INVENTION

The inventors have concluded, that a system that provides process tracking analytics and control can be created by using a database of process consumables data, ratios thereof, and correlations or these ratios to process inefficiencies.

This application discloses a process for capturing, tracking, and evaluating welding & cutting process consumables data and making automatic process improvement actions or automatically providing alerts and recommendations for process improvement actions to be taken by the process owner or weld process specialists. The following numbered sentences detail some aspects, features and embodiments:

SENTENCE 1. A metals welding or metals cutting process, the method comprising:
  a) performing a first welding or cutting process,
  b) consuming of two or more consumables in the first welding or cutting process,
  c) receiving from a process improvement system a communication comprising one or more of (i) a performance parameter representing the first welding or cutting process, (ii) a welding or cutting process efficiency benchmark, (iii) a degree of deviation of the performance parameter to the welding or cutting process efficiency benchmark, (iv) a consumables data, and (v) a process recommendation which is based at least in part on the performance parameter representing the first welding or cutting process, and
  d) implementing a process correction based on the communication of step c),
  e) performing a second welding or cutting process,
  f) wherein the process correction of step d) results in an efficiency improvement of the second welding or cutting process of step e) compared to the first welding or cutting process.

SENTENCE 2. The method of Sentence 1, further comprising a step of (i) providing consumables data b) to a process improvement system or (ii) providing an access to a process improvement system wherein the access is capable of transferring the consumables data of step b) to the process improvement system.

SENTENCE 3. The method of Sentences 1 and/or 2, comprising the step of providing the consumables data of step b) to a process improvement system.

SENTENCE 4. The method of Sentences 2 and/or 3, wherein the step of providing the consumables data of step b) to a process improvement system comprises a process owner placing purchase orders or other purchasing requests for the consumables with one or more suppliers of the consumables.

SENTENCE 5. The method of Sentences 1, 2, 3 and/or 4, comprising the step of providing the access to the process improvement system.

SENTENCE 6. The method of Sentences 1, 2, 3, 4 and/or 5, wherein the process improvement system access to the consumables data of step b) comprises one or more of access to data from a process owner's computer implemented inventory, supply and/or procurement systems.

SENTENCE 7. The method of Sentences 1, 2, 3, 4, 5 and/or 6, wherein the two or more consumables are selected from shielding gases, cutting gases, welding filler metal/wire, welding contact tips, cutting tips, wire nozzles, diffusors, welding gun liners, power, and spatter grinders.

SENTENCE 8. The method of Sentences 1, 2, 3, 4, 5, 6 and/or 7, wherein the increased efficiency of the second welding or cutting process compared to the first welding process is selected from a reduced consumption of one or more consumable, an improved weld or cut quality, an increased welding or cutting speed, a reduced equipment down time rate, and a reduced frequency of an equipment malfunction event.

SENTENCE 9. The method of Sentences 1, 2, 3, 4, 5, 6, 7 and/or 8, wherein the performance parameters representing the first welding or cutting process are selected from a) ratio or proportions of Purchased or Consumed Shielding Gas Components, b) a ratio of Purchased or Consumed Shielding Gas to Welding Wire, c) a ratio of Purchased or Consumed Welding Wire to Welding Contact Tips, d) a ratio of Purchased or Consumed Welding Wire to Welding Nozzles, e) a ratio of Purchased or Consumed Welding Wire to MIG Welding Guns, f) a ratio of Purchased or Consumed Welding Wire to Weld Gun Liners, g) a ratio of Purchased or Consumed Welding Wire to Weld Gas Diffusers, h) ratio of Purchased or Consumed Welding Wire to Weld Grinding Wheels, and i) a ratio of Purchased or Consumed Welding Wire to Weld Nozzle Shield Spray.

SENTENCE 10. The method of Sentences 1, 2, 3, 4, 5, 6, 7, 8 and/or 9, wherein the communication comprises one or more benchmarks and a degree of deviation between i) a performance parameter representing the first welding or cutting process and ii) at least one corresponding benchmark.

SENTENCE 11. The method of Sentence 10, wherein the benchmark is based on a comparator data set obtained from independent welding or cutting processes previously classified in a classification group shared by the first welding or cutting process.

SENTENCE 12. The method of Sentence 11, wherein the benchmark is based on a comparator data set of historical data obtained from a same welding or cutting operation or facility as the first welding or cutting process.

SENTENCE 13. The method of Sentences 1, 2, 3, 4, 5, 6, 7, 8, 9, 10, 11 and/or 12, wherein the communication comprises one or more process recommendations based on one or more performance parameters representing the first welding or cutting process, the one or more performance parameters selected from a) ratio or proportions of Purchased or Consumed Shielding Gas Components, b) a ratio of Purchased or Consumed Shielding Gas to Welding Wire, c) a ratio of Purchased or Consumed Welding Wire to Welding Contact Tips, d) a ratio of Purchased or Consumed Welding Wire to Welding Nozzles, e) a ratio of Purchased or Consumed Welding Wire to MIG Welding Guns, f) a ratio of Purchased or Consumed Welding Wire to Weld Gun Liners, g) a ratio of Purchased or Consumed Welding Wire to Weld Gas Diffusers, h) ratio of Purchased or Consumed Welding Wire to Weld Grinding Wheels, and i) a ratio of Purchased or Consumed Welding Wire to Weld Nozzle Shield Spray, SENTENCE 14. The method of Sentence 13, wherein the process recommendation, the process correction and the increased efficiency of the second welding or cutting process compared to the first welding process correspond to one or more of the rows in the following table:

| PERFORMANCE PARAMETER | PROCESS RECOMMENDATION & CORRECTION | EFFICIENCY IMPROVEMENT |
| --- | --- | --- |
| Purchased or Consumed Shielding Gas to Welding Wire ratio is high. | For process owners using a shielding gas supply system that feeds multiple welding or cutting sites within an operation, check for and fix gas leaks, surges and overflow throughout the gas distribution system. | Reduced shielding gas consumption. Reduce weld discontinuities/defects. |
| Purchased or Consumed Welding Wire to Welding Contact Tips ratio is outside targeted range | Measure and check for Electrical Resistance poor lead connections or improper cable size, Develop and run proper Weld Parameters, Look for Poor parts Fit Up and correct upstream cutting forming process, Replace Wrong GMAW consumables, Test and train Welders on proper procedure Repair Shield Gas leaks or mix Issue. Put proper PM program for Liner replacement | Reduced Weld Spatter, Reduce Weld Discontinuities, and Reduce tip consumption, Increase Arc ON Time, Reduce Grinding, and Reduced Rework. |
| Purchased or Consumed Welding Wire to Welding Nozzles ratio is outside targeted range | Check for Use of Correct Parts, Use positioner to weld in position, eliminate Electrical Resistance, Test and Train Welder on proper procedure. Create 5-S program for work cells | Reduced nozzle consumption, Increased cell productivity with higher deposition rates, reduction in spatter. reduce need for grinding |
| Purchased or Consumed Welding Wire to MIG Welding Guns ratio is outside targeted range | Use Maintenance Program to review gun daily for issues, Start 5S program (parts in place), Use Boom For feeder assembly to keep gun from dragging on floor. Replace consumables on a proper schedule, Check to see if correct amp gun is in place. Check gas flow for proper cooling and shielding | Reduce Consumption. Increased Arc-on time. Reduced Rework. |
| Purchased or Consumed Welding Wire to Weld Gun Liners ratio is outside targeted range | Replace Liner after every 500# wire used per gun, Revise Maintenance Program to review gun daily for issues, Use Boom For feeder assembly to keep gun from dragging on floor. | Consistent feeding of wire. Increased cell productivity. Fewer defects/discontinuities. Eliminate wire feed issues |
| Purchased or Consumed Welding Wire to Weld Gas Diffusers ratio is outside targeted range | Use Correct Parts, Check for Electrical Resistance, and Train Welder on proper procedure. Create 5-S program for work cells | Eliminate electrical resistance, save time, reduction in consumption |
| Purchased or Consumed Welding Wire to Weld Grinding Wheels ratio is outside targeted range | Use correct Abrasive for application, Eliminate Poor Fit-Up. Repair up stream cutting/forming applications, Repair Shield Gas leaks. Automate surface preparation for weldments/eliminate oil, mill scale. Bevel plate correctly. Reduce consumption | Save time on secondary process. Safer environment. Faster throughput. Abrasive consumption reduction |
| Actual average Melt Off Rate is below target | Increase wire feed speed. Put parts in position, Create Kan-Ban for parts. | Lower cost per part, better penetration, higher travel speeds |
| Average Operator Factor is below target | Address material handling/material flow throughout shop. Reduce secondary operations i.e., grinding, use of nozzle spray, and chipping/scraping spatter. Address parts fit up, create tighter tolerances | Higher productivity. Lower cost per part. Higher quality |

SENTENCE 15. The method of Sentences 1, 2, 3, 4, 5, 6, 7, 8, 9, 10, 11, 12, 13 and/or 14, wherein the process correction is implemented by the process owner.

SENTENCE 16. The method of Sentences 1, 2, 3, 4, 5, 6, 7, 8, 9, 10, 11, 12, 13 and/or 14, wherein the process correction is implemented by feedback control to one or more welding or cutting equipment.

SENTENCE 17. The method of Sentences 1, 2, 3, 4, 5, 6, 7, 8, 9, 10, 11, 12, 13 and/or 14, wherein the process correction is implemented by the operator of the process improvement system.

SENTENCE 18. The method of Sentences 1, 2, 3, 4, 5, 6, 7, 8, 9, 10, 11, 12, 13, 14, 15, 16 and/or 17, wherein the communication comprises an email, SENTENCE 19. The Sentences 1, 2, 3, 4, 5, 6, 7, 8, 9, 10, 11, 12, 13, 14, 15, 16 and/or 17, wherein the communication comprises a webpage accessible via an internet.

SENTENCE 20. A method of improving a welding or cutting process to increase the efficiency based on the consumption rate of welding or cutting consumables, the method comprising:
(1) measuring a consumption of a plurality of consumables,
(2) quantifying a consumption rate of the plurality of consumables,
(3) calculating a ratio or proportion of two or more consumption rates to produce a performance parameter,
(4) comparing the performance parameter to a benchmark,
(5) calculating a degree of deviation of the performance parameter to the benchmark,
(6) communicating one or more of (i) the performance parameter, (ii) the benchmark, (iii) the degree of deviation calculated in step e),
(7) communicating a process recommendation based on one or more of (6)(i)-(iii), and
(8) implementing a process correction based on the communication of step (6),
(9) wherein the process correction of step (8) results in an efficiency improvement of the welding or cutting process.

SENTENCE 21. A method of improving a welding or cutting process to increase the efficiency of the process based on the consumption rate of consumables, the method comprising:
(1) performing a first welding or cutting process,
(2) consuming of two or more consumables in the first welding or cutting process,
(3) receiving from a process improvement system a communication comprising one or more of (i) a performance parameter representing the first welding or cutting process, (ii) a welding or cutting process efficiency benchmark, (iii) a degree of deviation of the performance parameter to the welding or cutting process efficiency benchmark, (iv) a consumables data, and (v) a process recommendation based on one or more of c)(i)-(iv), and
(4) implementing a process correction based on the communication of step (3) to perform a second welding or cutting process,
(5) wherein the process correction of step (4) results in an increased efficiency of the second welding or cutting process compared to the first welding or cutting process.

SENTENCE 22. The methods described in SENTENCES 1-21, each method further comprising one or more of (i.e. any combination of) the following feature(s) or detail(s):
Consumables are selected from shielding gases, cutting gases, welding filler metal/wire, welding contact tips, cutting tips, wire nozzles, diffusors, welding gun liners, power, spatter grinders, and other consumables such as personal protective equipment or other safety equipment.
Performance Parameters may be one or more of:
A ratio or proportions of Purchased or Consumed Shielding Gas Components (e.g. Ar:CO2; He:Ar; He:Ar CO2)
A ratio of Purchased or Consumed Shielding Gas to Welding Wire
A ratio of Purchased or Consumed Welding Wire to Welding Contact Tips
A ratio of Purchased or Consumed Welding Wire to Welding Nozzles
A ratio of Purchased or Consumed Welding Wire to MIG Welding Guns
A ratio of Purchased or Consumed Welding Wire to Weld Gun Liners
A ratio of Purchased or Consumed Welding Wire to Weld Gas Diffusers
A ratio of Purchased or Consumed Welding Wire to Weld Grinding Wheels
A ratio of Purchased or Consumed Welding Wire to Weld Nozzle Shield Spray Additional operational data combined with consumables consumption rates to calculate a performance parameter may include one or more of:
Actual average Melt Off Rate (i.e. the weight or length of the electrode, wire, rod, or powder melted in a unit of time)
Average Operator Factor (i.e. the average percentage of the welders' work day that is actually spent welding for a specific welding or cutting process or location/operation)
Numbers of process operators (e.g. welders)
Number of automated equipment (e.g. robotic welding stations)
Amount of work hours performed by process operators such as welders (aggregated monthly total, weekly average, etc.)

Benchmarking may be performed by comparing process parameters with historical process parameter data for the same process site and/or by comparing process parameters to a data set of process parameter data from one or more other sites.

Performance Parameters, Process Corrections and Efficiency Improvements may be one or more of the following combinations of the three:

| PERFORMANCE PARAMETER | PROCESS RECOMMENDATION & CORRECTION | EFFICIENCY IMPROVEMENT |
|---|---|---|
| Purchased or Consumed Shielding Gas to Welding Wire ratio is high. | For process owners using a shielding gas supply system that feeds multiple welding or cutting sites within an operation, check for and fix gas leaks, surges and overflow throughout the gas distribution system. | Reduced shielding gas consumption. Reduce weld discontinuities/defects. |
| Purchased or Consumed Welding Wire to Welding Contact Tips ratio is outside targeted range | Measure and check for Electrical Resistance poor lead connections or improper cable size, Develop and run proper Weld Parameters, Look for Poor parts Fit Up and correct upstream cutting forming process, Replace Wrong GMAW consumables, Test and train Welders on proper procedure Repair Shield Gas leaks or mix Issue. Put proper PM program for Liner replacement | Reduced Weld Spatter, Reduce Weld Discontinuities, and Reduce tip consumption, Increase Arc ON Time, Reduce Grinding, and Reduced Rework. |

-continued

| PERFORMANCE PARAMETER | PROCESS RECOMMENDATION & CORRECTION | EFFICIENCY IMPROVEMENT |
|---|---|---|
| Purchased or Consumed Welding Wire to Welding Nozzles ratio is outside targeted range | Check for Use of Correct Parts, Use positioner to weld in position, eliminate Electrical Resistance, Test and Train Welder on proper procedure. Create 5-S program for work cells | Reduced nozzle consumption, Increased cell productivity with higher deposition rates, reduction in spatter. reduce need for grinding |
| Purchased or Consumed Welding Wire to MIG Welding Guns ratio is outside targeted range | Use Maintenance Program to review gun daily for issues, Start 5S program (parts in place), Use Boom For feeder assembly to keep gun from dragging on floor. Replace consumables on a proper schedule, Check to see if correct amp gun is in place. Check gas flow for proper cooling and shielding | Reduce Consumption. Increased Arc-on time. Reduced Rework. |
| Purchased or Consumed Welding Wire to Weld Gun Liners ratio is outside targeted range | Replace Liner after every 500# wire used per gun, Revise Maintenance Program to review gun daily for issues, Use Boom For feeder assembly to keep gun from dragging on floor. | Consistent feeding of wire, Increased cell productivity. Fewer defects/ discontinuities. Eliminate wire feed issues |
| Purchased or Consumed Welding Wire to Weld Gas Diffusers ratio is outside targeted range | Use Correct Parts, Check for Electrical Resistance, and Train Welder on proper procedure. Create 5-S program for work cells | Eliminate electrical resistance, save time, reduction in consumption |
| Purchased or Consumed Welding Wire to Weld Grinding Wheels ratio is outside targeted range | Use correct Abrasive for application, Eliminate Poor Fit-Up. Repair up stream cutting/forming applications, Repair Shield Gas leaks. Automate surface preparation for weldments/eliminate oil, mill scale. Bevel plate correctly. Reduce consumption | Save time on secondary process. Safer environment. Faster throughput. Abrasive consumption reduction |
| Actual average Melt Off Rate is below target Average Operator Factor is below target | Increase wire feed speed. Put parts in position. Create Kan-Ban for parts. Address material handling/ material flow throughout shop. Reduce secondary operations i.e., grinding, use of nozzle spray, and chipping/scraping spatter. Address parts fit up, create tighter tolerances | Lower cost per part, better penetration, higher travel speeds Higher productivity. Lower cost per part, Higher quality |

Communications may be by email, mail, fax, text, phone call, and/or a graphic user interface of a dedicated app or a website.

BRIEF DESCRIPTION OF THE SEVERAL VIEWS OF THE DRAWING

For a further understanding of the nature and objects for the present invention, reference should be made to the following detailed description, taken in conjunction with the accompanying drawings, in which like elements are given the same or analogous reference numbers and wherein.

DETAILED DESCRIPTION OF THE PREFERRED EMBODIMENTS

Figure 1:
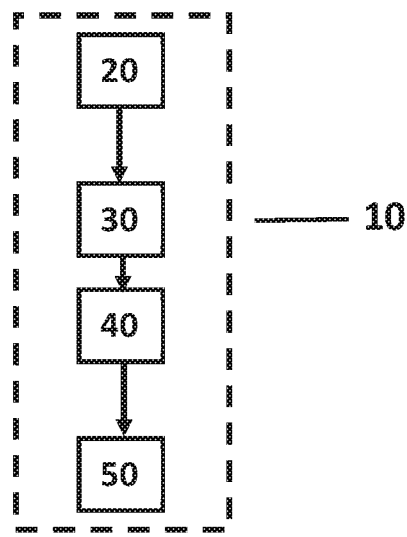
FIG. 1 shows a schematic of the overall Process Improvement System.

In several embodiments, the present invention produces an automatic process control feedback and/or process improvement recommendations. These feedback and recommendations are based on capturing consumable data, performing data analytics (detailed below) and establishing logical process improvement recommendations and actions based on consumables' consumption ratios and process inefficiency correlations.

Because the process deviations have a tendency to drift over time, continuous process analyzers, such as those described in U.S. Pat. No. 7,227,099B2, can be used to capture consumables data, but are not necessary. The consumables data can often be capture via an existing ERP procurement platform; or via other existing data systems, and therefore the system herein does not require the installation and related costs of specific process analyzers.

Process Improvement System Operation

Measuring the consumption of consumables and calculating ratios of each can 1) provide a relative indication of how efficient the corresponding process is, 2) provide indicators on where inefficiencies exist, and 3) identify likely sources of those inefficiencies. In general, in several embodiments of the invention, the process improvement system therefore performs the following steps:

a) Data acquisition of the rate and/or quantity of consumables use ("consumables data");

b) Using the consumables data to calculate a set of ratios and other data relationship transformations ("performance parameters");

c) Optionally, in preferred embodiments, comparing the calculated performance parameters to one or more predefined or predetermined standards, to ascertain the degree of deviation from the standard(s) ("benchmarking");

d) Based on the calculated performance parameters, and optionally the benchmarking, executing one or both of:

A) an automatic process improvement ("feedback control");

B) a notification of recommendation(s) to execute specific process improvement actions ("process recommendation(s)");

In preferred embodiments, in cases where the system provides a process recommendation, the process owner (e.g.

a welding shop) executes at least one such process recommendation, which thereby improves one or more performance parameter and results in increased efficiency in the process ("process correction"). A process correction can yield such efficiency outcomes as a reduced consumption of consumables (wire, shielding gas, etc.), an improved weld quality, an increased welding speed, an increased cutting speed, a reduced equipment down time, a reduced frequency of equipment malfunction events, or any other aspect of a process that influences productivity and/or cost.

Consumables

Industrial welding and cutting processes (generally referred to herein as "processes"), used in the fabrication of intermediate feedstock materials, parts/components and final products, require the consumption of various consumables during the welding or cutting process. For example, shielding gases, cutting gases, welding filler metal/wire, welding contact tips, cutting tips, wire nozzles, diffusors, welding gun liners, power, spatter grinders, and other consumables such as personal protective equipment or other safety equipment.

Process Improvement System Components

A "Process Improvement System" (10) is defined as including a consumables data acquisition component (20), a performance parameter calculation component (30), a process recommendation component (40) and a communication component (50). Optionally, in some embodiments, the Process Improvement System (10) further includes a feedback control component (60).

The consumables data acquisition component (20) may be a system containing data regarding the purchase of consumables, such as a computer managing a process owner's procurement or inventory management process(es) or an onsite consumables vending machine. Alternatively, the consumables data acquisition component (20) may be a process sensor measuring, intermittently or in near real time, the actual consumption rate of a consumable (e.g. wire use or gas use). The consumables data acquisition component (20) may acquire the consumables data in any way feasible. Exemplary data acquisitions include a) accessing a process owner's computer implemented inventory, supply and/or procurement systems, b) process owner's purchase orders or other purchasing requests that are stored in one or more suppliers' electronic records, c) manual data entry by a vendor service representative or a customer, and/or d) via sensor data (discussed below).

The performance parameter calculation component (30) is a specifically programmed computer, configured to transform the consumables data into performance parameters (as described below).

The process recommendation component (40) is a specifically programmed computer, configured to identify performance parameter(s) that indicate a need for a process correction and correlate the performance parameter(s) with potential cause(s) (as described below). In some embodiments, the correlation is based, at least in part, on a lookup table, indexing performance parameter(s) to possible causes and associated process recommendations for remedial process corrections.

In some embodiments, the performance parameter calculation component (30) and the process recommendation component (40) are the same computer.

The communication component (50) is operated by the process recommendation component (40) to transmit the process recommendation(s) to one or more recipients. For example, the communication component (50) may be an automated email generation system that transmits a process recommendation to a process owner by email (55).

Alternatively, the communication component (50) may generate webpage or graphic user interface, specifically configured to display one or more of the consumables data, performance parameter values, benchmarking values, degree of deviation between performance parameter values and benchmarking values, and process recommendation(s). The webpage or graphic user interface may be accessible via the internet.

Example Process Improvement System

Figure 2:
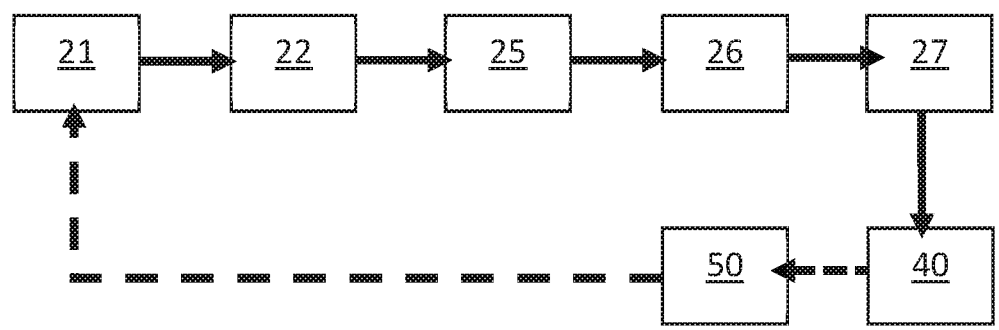
FIG. 2 shows an embodiment of the Process Improvement System.
Figure 3:
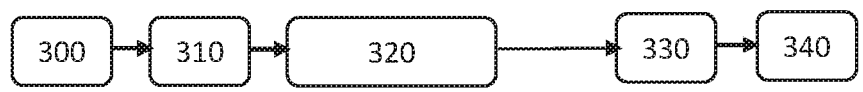
FIG. 3 shows an embodiment of the general method of use of the Process Improvement System corresponding to original claim 1.
Figure 4:
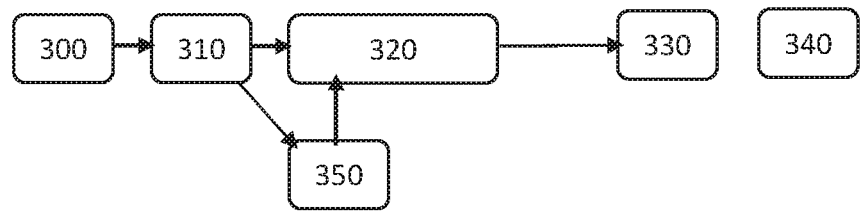
FIG. 4 shows an embodiment of the method of use of the Process Improvement System corresponding to original claims 2 and 3.
Figure 5:
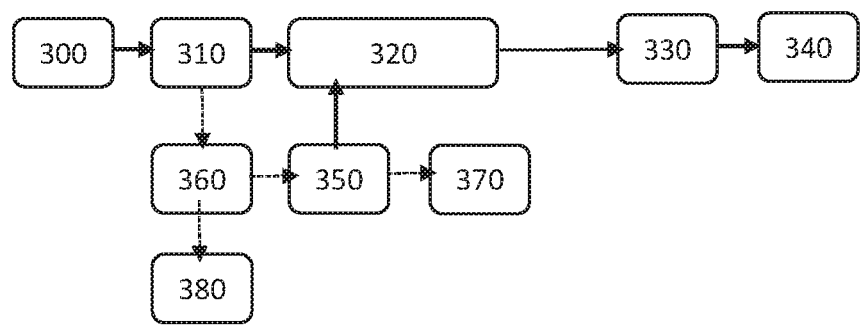
FIG. 5 shows an embodiment of the method of use of the Process Improvement System corresponding to original claims 4-6.
Figure 6:
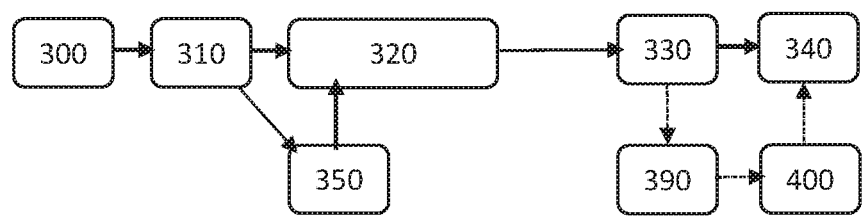
FIG. 6 shows an embodiment of the method of use of the Process Improvement System corresponding to original claim 16.
Figure 7:
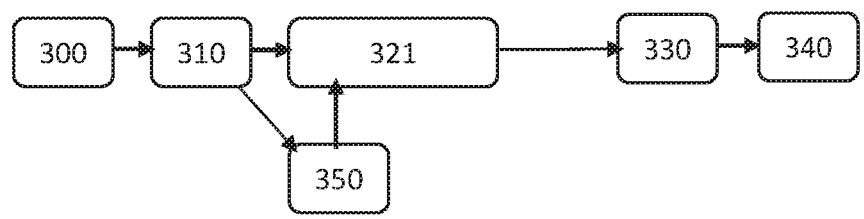
FIG. 7 shows an embodiment of the method of use of the Process Improvement System corresponding to original claim 18.
Figure 8:
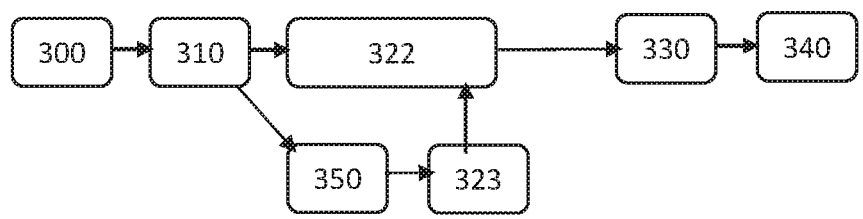
FIG. 8 shows an embodiment of the method of use of the Process Improvement System corresponding to original claim 19.

As shown in FIG. 2, the Process Improvement System (11) includes the consumables data acquisition components (21-22) in the form of a) a website (21) through which a customer inputs or uploads a purchase request or order for consumables and b) a data repository (22) containing consumables data acquired though other channels along with historical consumables data. An exemplary data repository is SAP® BUSINESS WAREHOUSE. Consumables data from multiple consumables data acquisition components is formatted and standardized for data processing and sent via an integration component (25) to a data lake storage component (26) and then to an SQL DATABASE™ (27). Consumables data is then transferred to the process recommendation component (40) such as an SQL SERVER ANALYSIS SERVICES™. The process recommendation component (40) delivers process recommendation results to a communication component (50) such as POWER BI™ to produce a process recommendation report for a process owner. The process recommendation report may be a graphic display file in html sent by the communication component (50) to a process owner's computer. In this example, the process owner accesses the process recommendation report via the same website (21) also having one of the data acquisition components, such as a in a customer account portal.

Performance Parameters

The performance parameters are ratios or other data transformations, of at least two distinct consumables data, to derive a calculated performance parameter. Exemplary performance factors include:

A ratio or proportions of Purchased or Consumed Shielding Gas Components (e.g. Ar $CO_2$; He:Ar; He:Ar:$CO_2$)

A ratio of Purchased or Consumed Shielding Gas to Welding Wire

A ratio of Purchased or Consumed Welding Wire to Welding Contact Tips

A ratio of Purchased or Consumed Welding Wire to Welding Nozzles

A ratio of Purchased or Consumed Welding Wire to MIG Welding Guns

A ratio of Purchased or Consumed Welding Wire to Weld Gun Liners

A ratio of Purchased or Consumed Welding Wire to Weld Gas Diffusers

A ratio of Purchased or Consumed Welding Wire to Weld Grinding Wheels

A ratio of Purchased or Consumed Welding Wire to Weld Nozzle Shield Spray

Other operational data and information may be combined with performance factors for benchmarking, process recommendation(s), and/or feedback control. Exemplary operational data include:

Actual average Melt Off Rate (i.e. the weight or length of the electrode, wire, rod, or powder melted in a unit of time)

Average Operator Factor (i.e. the average percentage of the welders' work day that is actually spent welding for a specific welding or cutting process or location/operation)

Numbers of process operators (e.g. welders)

Number of automated equipment (e.g. robotic welding stations)

Amount of work hours performed by process operators such as welders (aggregated monthly total, weekly average, etc.)

Benchmarking

Benchmarking utilizes the performance parameters and, optionally, additional operational data, to compare a specific process to an ideal or real world derived comparator data. For example, the comparator data may be the closest to optimal in a classification of processes (e.g. mild steel semi-automated welding) based on a collection of data derived from a number of measured processes in the classification. The comparator data may be a calculated or hypothetical ideal value. The comparator data may be historical process data for the same process (e.g. a weld shop's own best historical performance). The benchmarking may be implemented in a variety of ways. One form of benchmarking may be ranking a specific process in terms of "top 20%" or quartiles within a combined dataset of similarly classified processes. The ranking could be by for a specific performance parameter or a combination of performance parameters such as a weighted composite score.

Process Recommendation(s)

When a performance parameter deviates from the expected or a benchmarked performance parameter range defined as correlating with an acceptable performance efficiency, this deviation is likely tied to specific areas of poor or inefficient operation. The Process Improvement System calculates the performance parameters, identifies deleterious or suboptimal performance parameter values, and correlates one or more process parameter deviation(s) with possible causes.

The Process Improvement System can for example have a "look up" table, with Process Parameters correlated with Process Recommendations. Specific causal factors and more targeted process recommendation(s) are more readily identified using combinations of performance parameters. The Process Improvement System may, in some embodiments, include software for machine learning. In specific embodiments, the machine learning includes pattern recognition based machine learning programming that uses an initial benchmark data as the training set.

Process Correction and Automated Feedback Control

The Process Improvement System supplies one or more process recommendations to process owners for improving their process. Generally, a service provider (such as the one operating the Process Improvement System), or the process owner, implement at least one process recommendation(s) as a process correction(s), thereby improving the process owner's welding and/or cutting process.

Alternatively, certain process corrections may be implemented directly by computer implemented feedback control of one or more pieces of process equipment (e.g, a robotic welding station) to modify an operating parameter of the equipment per a process recommendation, thereby improving the process owner's welding and/or cutting process.

The process corrections are correlated with performance parameters and welding or cutting process efficiency improvement as stated by rows in the following table.

| PERFORMANCE PARAMETER | PROCESS RECOMMENDATION & CORRECTION | EFFICIENCY IMPROVEMENT |
| --- | --- | --- |
| Purchased or Consumed Shielding Gas to Welding Wire ratio is high. | For process owners using a shielding gas supply system that feeds multiple welding or cutting sites within an operation, check for and fix gas leaks, surges and overflow throughout the gas distribution system. | Reduced shielding gas consumption. Reduce weld discontinuities/ defects. |
| Purchased or Consumed Welding Wire to Welding Contact Tips ratio is outside targeted range | Measure and check for Electrical Resistance poor lead connections or improper cable size, Develop and run proper Weld Parameters, Look for Poor parts Fit Up and correct upstream cutting forming process, Replace Wrong GMAW consumables, Test and train Welders on proper procedure Repair Shield Gas leaks or mix Issue. Put proper PM program for Liner replacement | Reduced Weld Spatter, Reduce Weld Discontinuities, and Reduce tip consumption, Increase Arc ON Time, Reduce Grinding, and Reduced Rework. |
| Purchased or Consumed Welding Wire to Welding Nozzles ratio is outside targeted range | Check for Use of Correct Parts, Use positioner to weld in position, eliminate Electrical Resistance, Test and Train Welder on proper procedure. Create 5-S program for work cells | Reduced nozzle consumption, Increased cell productivity with higher deposition rates, reduction in spatter, reduce need for grinding |
| Purchased or Consumed Welding Wire to MIG Welding Guns ratio is outside targeted range | Use Maintenance Program to review gun daily for issues, Start 5S program (parts in place), Use Boom For feeder assembly to keep gun from dragging on floor. Replace consumables on a proper schedule, Check to see if correct amp gun is in place. Check gas flow for proper cooling and shielding | Reduce Consumption. Increased Arc-on time. Reduced Rework. |
| Purchased or Consumed Welding Wire to Weld Gun Liners ratio is outside targeted range | Replace Liner after every 500# wire used per gun, Revise Maintenance Program to review gun daily for issues, Use Boom For feeder assembly to keep gun from dragging on floor. | Consistent feeding of wire. Increased cell productivity. Fewer defects/ discontinuities. Eliminate wire feed issues |
| Purchased or Consumed Welding Wire to Weld Gas Diffusers ratio is outside targeted range | Use Correct Parts, Check for Electrical Resistance, and Train Welder on proper procedure. Create 5-S program for work cells | Eliminate electrical resistance, save time, reduction in consumption |
| Purchased or Consumed Welding Wire to Weld Grinding Wheels ratio is outside targeted range | Use correct Abrasive for application, Eliminate Poor Fit-Up. Repair up stream cutting/ forming applications, Repair Shield Gas leaks. Automate surface preparation for weldments/eliminate oil, mill scale. Bevel plate correctly. Reduce consumption | Save time on secondary process. Safer environment, Faster throughput. Abrasive consumption reduction |
| Actual average Melt Off Rate is below target | Increase wire feed speed. Put parts in position. Create Kan-Ban for parts. | Lower cost per part, better penetration, higher travel speeds |
| Average Operator Factor is below target | Address material handling/ material flow throughout shop. Reduce secondary operations i.e., and grinding, use of nozzle spray, chipping/scraping spatter. Address parts fit up, create tighter tolerances | Higher productivity. Lower cost per part. Higher quality |

Process Sensors

In some embodiments, one or more process sensors are used to measure operational data, consumables rate of consumption, or both. These "senor data" provide additional information about the process to the Process Improvement System for use as a basis for, or in conjunction with, performance parameter(s).

An example of a common process sensor is a welding gas mass flow meter. Many other welding/cutting process sensors are established in the art. See, e.g., Kah, P., et al. "*Robotic arc welding sensors and programming in industrial applications.*" International Journal of Mechanical and Materials Engineering 10.1 (2015): 13.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A metals welding or metals cutting process, the method comprising:
   a) a plurality of process operators performing a plurality of first welding or cutting processes (300),
   b) consuming of two or more consumables in the plurality of first welding or cutting processes (310),
   c) receiving from a process improvement system a communication (320) comprising one or more of (i) a performance parameter representing the plurality of first welding or cutting processes, (ii) a welding or cutting process efficiency benchmark for the plurality of first welding or cutting processes, (iii) a degree of deviation of the performance parameter to the welding or cutting process efficiency benchmark, (iv) a consumables data for the plurality of first welding or cutting processes, and (v) a process recommendation which is based at least in part on the performance parameter representing the plurality of first welding or cutting processes, and
   d) implementing a process correction based on the communication of step c) (330),
   e) the plurality of process operators performing a second plurality of welding or cutting processes (340),
   wherein the process correction of step d) results in an efficiency improvement of the plurality of second welding or cutting processes of step e) compared to the plurality of first welding or cutting processes.

2. The method of claim 1, further comprising a step of (i) providing consumables data b) to the process improvement system (350) or (ii) providing an access to a process improvement system (360) wherein the access is capable of transferring the consumables data of step b) to the process improvement system.

3. The method of claim 2, comprising the step of providing the consumables data of step b) to the process improvement system (350).

4. The method of claim 3, wherein the step of providing the consumables data of step b) to the process improvement system comprises a process owner placing purchase orders or other purchasing requests for the consumables with one or more suppliers of the consumables (370).

5. The method of claim 2, comprising the step of providing the access to the process improvement system (360).

6. The method of claim 5, wherein the process improvement system access to the consumables data of step b) comprises one or more of access to data from a process owner's computer implemented inventory, supply and/or procurement systems (380).

7. The method of claim 1, wherein the two or more consumables are one or more of shielding gases, cutting gases, welding filler metal/wire, welding contact tips, cutting tips, wire nozzles, diffusors, welding gun liners, electrical power, and spatter grinders.

8. The method of claim 1, wherein the increased efficiency of the second welding or cutting process compared to the first welding process is selected from a reduced consumption of one or more consumable, an improved weld or cut quality, an increased welding or cutting speed, a reduced equipment down time rate, and a reduced frequency of an equipment malfunction event.

9. The method of claim 1, wherein the performance parameters representing the first welding or cutting process are selected from a) ratio or proportions of Purchased or Consumed Shielding Gas Components, b) a ratio of Purchased or Consumed Shielding Gas to Welding Wire, c) a ratio of Purchased or Consumed Welding Wire to Welding Contact Tips, d) a ratio of Purchased or Consumed Welding Wire to Welding Nozzles, e) a ratio of Purchased or Consumed Welding Wire to MIG Welding Guns, f) a ratio of Purchased or Consumed Welding Wire to Weld Gun Liners, g) a ratio of Purchased or Consumed Welding Wire to Weld Gas Diffusers, h) ratio of Purchased or Consumed Welding Wire to Weld Grinding Wheels, and i) a ratio of Purchased or Consumed Welding Wire to Weld Nozzle Shield Spray.

10. The method of claim 1, wherein the communication comprises one or more benchmarks and a degree of deviation between i) a performance parameter representing the plurality of first welding or cutting processes and ii) at least one corresponding benchmark.

11. The method of claim 10, wherein the benchmark is based on a comparator data set obtained from independent welding or cutting processes previously classified in a classification group shared by the plurality of first welding or cutting processes.

12. The method of claim 10, wherein the benchmark is based on a comparator data set of historical data obtained from a same welding or cutting operation or facility as the plurality of first welding or cutting processes.

13. The method of claim 1, wherein the communication comprises one or more process recommendations based on one or more performance parameters representing the first welding or cutting process, the one or more performance parameters selected from a) ratio or proportions of Purchased or Consumed Shielding Gas Components, b) a ratio of Purchased or Consumed Shielding Gas to Welding Wire, c) a ratio of Purchased or Consumed Welding Wire to Welding Contact Tips, d) a ratio of Purchased or Consumed Welding Wire to Welding Nozzles, e) a ratio of Purchased or Consumed Welding Wire to MIG Welding Guns, f) a ratio of Purchased or Consumed Welding Wire to Weld Gun Liners, g) a ratio of Purchased or Consumed Welding Wire to Weld Gas Diffusers, h) ratio of Purchased or Consumed Welding Wire to Weld Grinding Wheels, and i) a ratio of Purchased or Consumed Welding Wire to Weld Nozzle Shield Spray.

14. The method of claim 1, wherein the process correction is implemented by the process owner.

15. The method of claim 1, wherein the process correction is implemented by a feedback control (390) to one or more welding or cutting equipment (400).

16. The method of claim 1, wherein the communication comprises an email (321).

17. The method of claim 1, wherein the communication comprises a webpage (322) accessible via an internet (323).

* * * * *